United States Patent [19]
Ripley

[11] Patent Number: 5,451,021
[45] Date of Patent: Sep. 19, 1995

[54] SNAP-IN BRACKET

[75] Inventor: Brian D. Ripley, Webster City, Iowa

[73] Assignee: White Consolidated Industries, Inc., Cleveland, Ohio

[21] Appl. No.: 41,474

[22] Filed: Apr. 2, 1993

[51] Int. Cl.6 .................................................. G12B 9/00
[52] U.S. Cl. ................................ 248/27.3; 248/231.9; 248/300
[58] Field of Search ......................... 248/27.3, 300, 906, 248/231.9, 221.4, 225.31, 231.8, 205.1; 220/3.9, 3.5, 3.3, 3.2

[56] References Cited

U.S. PATENT DOCUMENTS

| | | | |
|---|---|---|---|
| 1,484,001 | 2/1924 | Ainsworth | 248/300 |
| 2,632,615 | 3/1953 | Churchill | 248/27.3 |
| 2,874,254 | 3/1959 | Daily et al. | 248/27.3 X |
| 2,962,252 | 11/1960 | Frank | 248/231.8 |
| 3,168,612 | 2/1965 | Sorenson | 248/27.3 X |
| 3,793,563 | 2/1974 | Brefka | 248/27.3 X |
| 4,340,795 | 7/1982 | Arthur | 248/27.3 X |
| 4,964,525 | 10/1990 | Coffey et al. | 248/906 X |
| 5,056,853 | 10/1991 | Van Order | 248/27.3 X |

FOREIGN PATENT DOCUMENTS 242773 of 1965 Austria ................ 248/300
59250 of 1941 Denmark .

Primary Examiner—Ramon O. Ramirez
Assistant Examiner—Korie H. Chan
Attorney, Agent, or Firm—Pearne, Gordon, McCoy & Granger

[57] ABSTRACT

A switch package mounting bracket is provided which securely mounts a switch package to a control console of a domestic appliance. The mounting bracket provides a tripod support which laterally stabilizes the switch package, in addition to preventing inward or outward movement thereof relative to the control console. The switch mounting bracket provides, at one end, a first mounting tab and, at an opposite end, a pair of second mounting tabs. The first mounting tab is generally in-line with the longitudinal center line of the mounting bracket while each of the second mounting tabs are equidistantly spaced outboard of the mounting bracket center line. The second mounting tabs are located inwardly from a terminal edge of the switch package, allowing the overall length of the mounting bracket, and the control console hole necessary to accommodate it, to be reduced. The present invention improves upon known mounting brackets which provide mounting tabs which are relatively outwardly spaced from the ends of the switch package and thereby increase the overall length of the hole required to accommodate the mounting bracket.

15 Claims, 2 Drawing Sheets

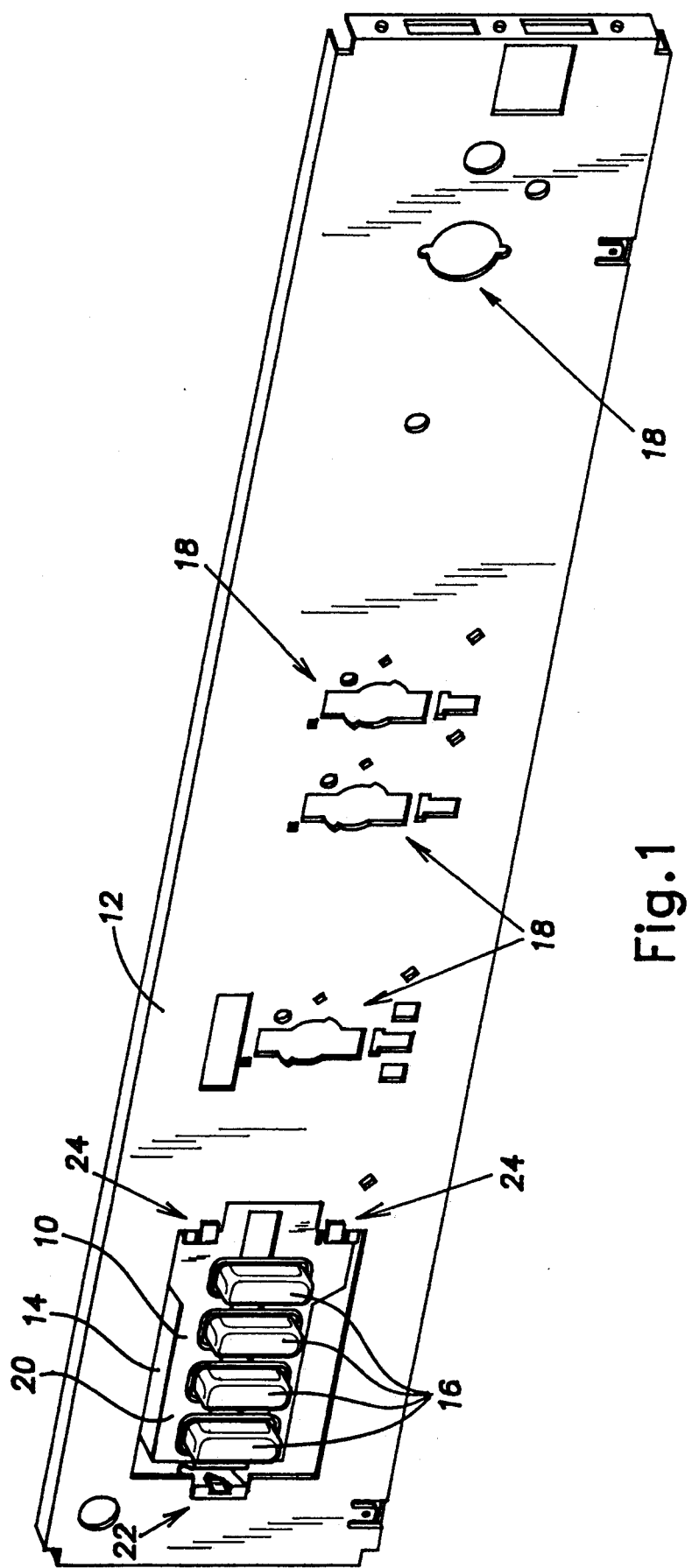

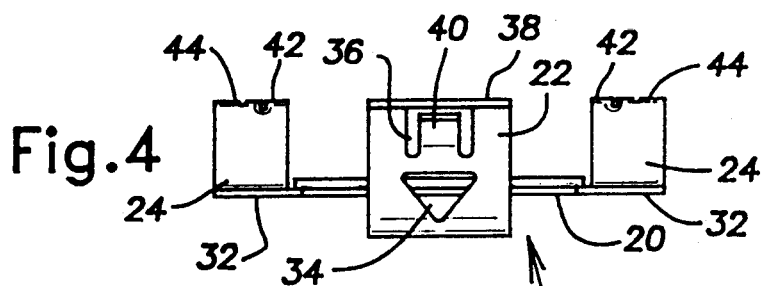
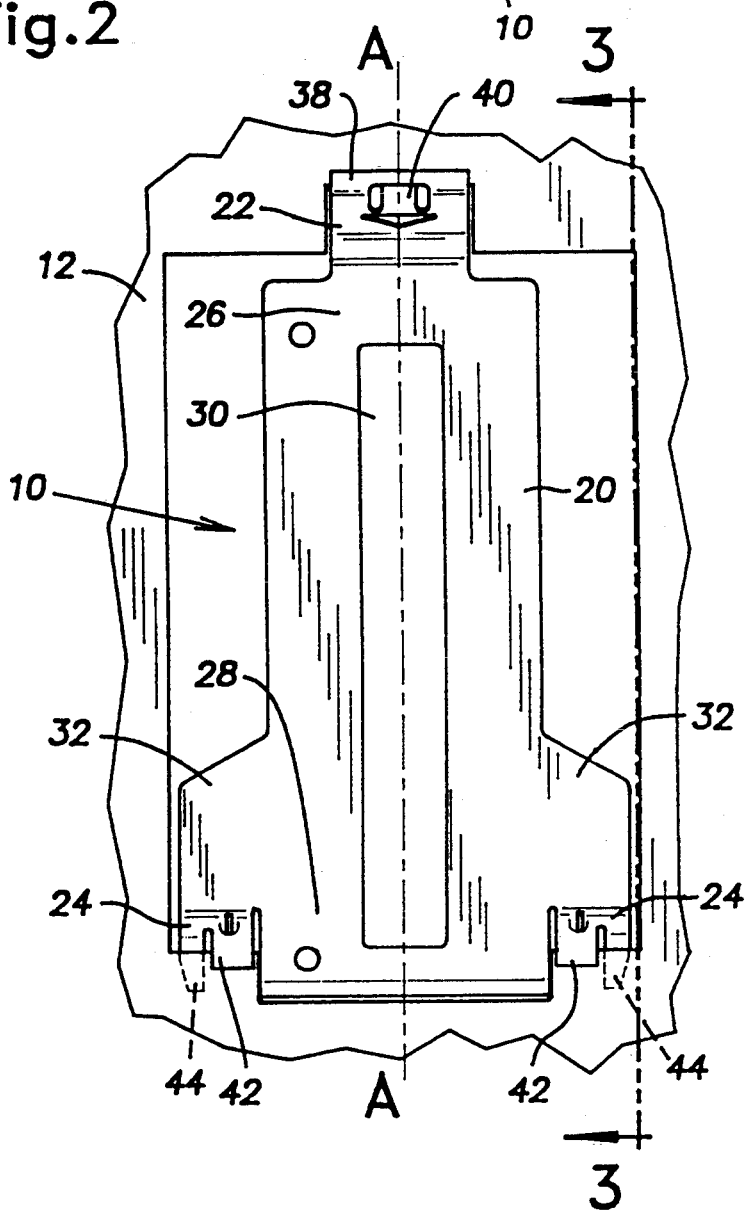
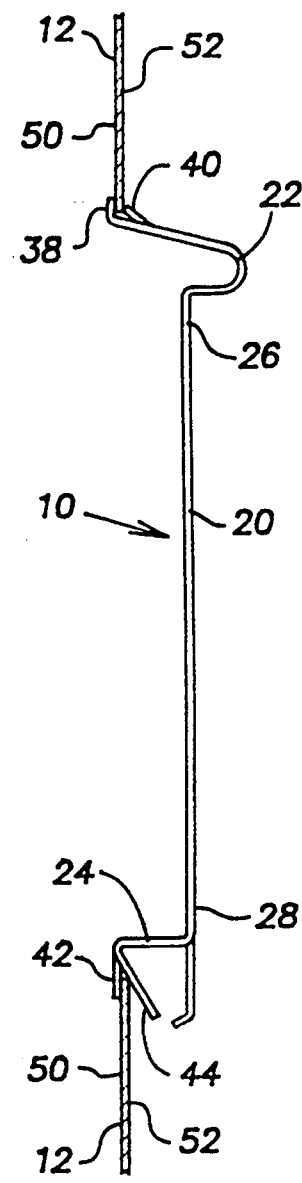
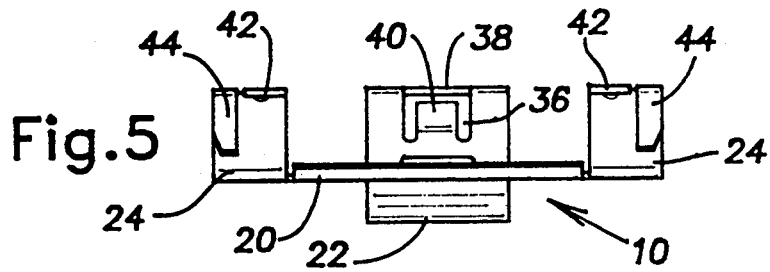

SNAP-IN BRACKET

BACKGROUND OF THE INVENTION

1. Field of the Invention

The present invention relates generally to mounting brackets and, more particularly, to snap in mounting brackets for mounting control instruments or switch packages to appliance control consoles.

2. Description of the Related Art

In domestic appliances, several means have been developed over the years to mount appliance control instruments, in the form of a switch package, to the appliance control console. For example, the switch package can be mounted by conventional fasteners or, alternatively, can be mounted to the control console via a mounting bracket.

One such mounting bracket presently known employs a C-shaped main body which attaches to the top surface of the switch package. The C-shaped main body generally surrounds or encircles, on three sides, a plurality of push buttons provided by the switch package. A pair of resilient snap tabs, one extending outwardly from each of the upper and lower ends of the C-shaped main body, are provided to attach the bracket to the control console and, thus, mount the switch package in the appliance. The snap tabs each include a pair of resilient fingers, one finger engaging an inner surface of the control console and another finger engaging an outer surface of the control console, trapping the control console therebetween.

This known mounting bracket is attached to the control console by sliding one end of the mounting bracket and, more specifically, one of the snap tabs, into engagement with the control console adjacent an opening in the control console such that the snap tab engages the inner and outer surfaces of the control console, as previously described. Thereafter, the opposite end of the mounting bracket is pivoted toward the control console and the second snap tab is snapped or resiliently fitted to the control console such that the control console is trapped by the snap tab.

The above-described mounting brackets suffer from several shortcomings or disadvantages that reduce their desirability. For example, since the resilient mounting tabs extend outwardly from each end of the bracket and, hence, are outwardly spaced from each end of the switch package, the overall length of the mounting bracket, and the associated hole or opening in the control console necessary to accommodate the bracket and switch package, is excessive for some applications. Also, since the mounting tabs are generally in-line with the longitudinal axis of the mounting bracket and switch package, there is limited lateral stability and the package is apt to pivot or rock about its axis.

Therefore, there exists a need in the art for a mounting bracket which has a more compact design and which provides a laterally stable support or base for the switch package.

SUMMARY OF THE INVENTION

In accordance with the present invention, a switch package mounting bracket is provided which securely mounts a switch package to a control console. The mounting bracket provides a tripod support which laterally stabilizes the switch package, in addition to preventing inward or outward movement relative to the control console.

In further accordance with the present invention, the switch mounting bracket provides, at one end, a first mounting tab and, at an opposite end, a pair of second mounting tabs. The first mounting tab is generally in-line with the longitudinal center line of the mounting bracket while each of the second mounting tabs are equidistantly-spaced outboard of the mounting bracket center line.

The present invention provides a relatively compact and laterally stable support for the switch package. The second mounting tabs are located inwardly from a terminal edge of the switch package, allowing the overall length of the mounting bracket, and the hole in the control console necessary to accommodate it, to be reduced.

In further accordance with the present invention, the mounting bracket is adapted to easily and quickly mount within the control console. Mounting is accomplished by hooking the second mounting tabs over the control console and resiliently snapping the first mounting tab into engagement with the control console. Once mounted within the control console, the first and second mounting tabs cooperate to laterally stabilize the switch package.

BRIEF DESCRIPTION OF THE DRAWING FIGURES

These and further features of the present invention will be apparent with reference to the following description and drawings, wherein:

FIG. 1 is a perspective view of a control console and a switch package mounted therein by a switch mounting bracket according to the present invention;

FIG. 2 is a front elevational view, with portions broken away, of the switch mounting bracket mounted within the control console of FIG. 1 in accordance with the present invention;

FIG. 3 is a side elevational view, partially in cross section, of the switch mounting bracket mounted to the control console taken along line 3—3 of FIG. 2;

FIG. 4 is top plan view of a first end of the switch mounting bracket according to the present invention; and, FIG. 5 is a bottom plan view of a second end of the switch mounting bracket according to the present invention.

DETAILED DESCRIPTION OF THE PREFERRED EMBODIMENT

With reference to the drawing figures and particularly FIG. 1, a switch package mounting bracket 10 according to the present invention is shown mounted to a control console 12 of a domestic appliance (not shown), such as a clothes dryer or washing machine. The mounting bracket 10 attaches a switch package 14 to the control panel 12 such that the various pushbuttons 16 provided by the switch package are accessible for user actuation and inspection. Alternatively, the switch package 14 may provide switches, knobs, or the like, as required. It is also contemplated that the control console 12 will accommodate various other control instruments, and provides additional mounting apertures 18 to accommodate or receive same.

For a further description of these additional mounting apertures 18, and the manner in which they are adapted to receive various control devices or instruments, reference should be made to the commonly assigned U.S. patent application Ser. No. 07/984,360, the disclosure of which is expressly incorporated herein in its entirety. For a detailed description of the manner in which the control console 12 is attached or mounted within the appliance, reference should be made to the commonly assigned U.S. patent application Ser. No. 07/890,672, the disclosure of which is expressly incorporated herein by reference.

With specific reference to FIGS. 2-4, the mounting bracket 10 is shown to include a central body member 20, a first tab 22, and a pair of second tabs 24. The first and second tabs 22, 24 are provided at first and second ends 26, 28 (FIG. 2) of the central body member 20 and cooperate to define a mounting means which is adapted to attach the mounting bracket 10, including the switch package 14 associated therewith, to the control console 12.

The central body member 20 of the mounting bracket 10 is attached by conventional mechanical fastening means such as screws, rivets, staking, or the like to the upper surface of a switch package, generally tracing the perimeter of the switch package. As shown in FIG. 2, the illustrated mounting bracket 10 defines a central lengthwise-directed aperture 30 through which pushbutton shafts or stems provided by the switch package 14 extend.

Naturally, the shape and size of the central aperture 30 is dictated by the actuation device employed by the switch package 14, the illustrated preferred embodiment specifically depicting use with a multi-pushbutton assembly. Therefore, it should be clear that the size and shape of the aperture described herein is merely included to disclose the preferred embodiment of the present invention presently contemplated by the inventors, and in no way limits the scope of the present invention thereto.

The central body member 20 is generally rectangular, the first end 26 including the first mounting tab 22 and the second end 28 including a pair of lengthwise-directed mounting wings 32. The first resilient mounting tab 22 is generally in line with a longitudinal axis or center line A—A of the central body member 20, as illustrated. Each of the mounting wings 32, which are relatively outboard of the longitudinal center line A-A, provide, at terminal ends thereof, one of the second tabs 24.

As shown best in FIGS. 2 and 3, the first tab 22 is generally J-shaped and preferably includes a triangular-shaped cut out 34, a generally upside-down U-shaped cut-out 36, and a terminal retaining member 38. The material remaining inside the upside-down U-shaped cut out 36 is outwardly bent slightly and defines a spring finger 40. A short distance above the spring finger 40, an outwardly-directed terminal end of the J-shaped first tab 22 defines the retaining member 38. As will be discussed more fully hereafter with reference to mounting of the bracket 10 within the control console 12, the spring finger 40 resiliently deforms to trap the control console 12 between the spring finger 40 and the retaining portion 38, thereby attaching or mounting the bracket 10 and associated switch package 14 within the control console (FIG. 1).

With continued reference to FIGS. 2-5, the second tabs 24 are shown to extend upwardly and outwardly from the mounting wings 32. A terminal part of each second tab 24 is split, defining laterally inner and outer portions 42 and 44. The inner portions 42 are generally parallel to, but upwardly spaced from, the central body member 20 while the outer portions 44 are bent downwardly toward an extension of a plane defined by the central body member 20. As so formed, the inner and outer portions 42 and 44 of the second tabs 24 are adapted to trap or receive a portion of the control console 12 and thereby mount or attach the second end 28 of the mounting bracket within the hole provided by the control console 12, as will be discussed hereafter.

The inner portions 42 of the second tabs 24 and retaining member 38 of the first tab 22 are co-planar and, when the mounting bracket 10 is mounted within the control console 12, are in engagement with an outer surface 50 of the control console while the outer portion 44 of the second tab 24 and the spring finger 40 of the first tab 22 are in engagement with an inner surface 52 of the control console 12. It should be noted that while the first tab 22 extends outwardly a short distance from the end of the central body member 20 and, hence, the switch package 14, the second tabs 24 are spaced or set back a short distance from the end of the mounting bracket 10 and the switch package 14 (FIG. 3). By inwardly spacing the second tabs 24 from the terminal end of the mounting bracket 10 and switch package 14, the overall length of the mounting bracket 10, and the hole in the control console 12 into which it is mounted, is reduced.

The mounting bracket 10 and switch package 14 attached thereto are mounted within the control console 12 as follows. With the first end 26 of the mounting bracket 10 spaced relatively above the outer surface of the control console 12, the second end 28 of the mounting bracket is positioned adjacent the control console such that the inner portion 42 of the second tab 24 engages the outer surface 50 of the control console 12 while the outer portion 44 of the second tab engages the inner surface 52 of the control console. Thereafter, the mounting bracket 10 is pivoted to bring the spring finger 40 of the first tab 22 into engagement with the control console. The mounting bracket 10 is pushed or forced toward the control console 12 against the bias of the spring finger 40, deforming the spring finger until it passes through the hole in the control console 12 and resiliently snaps outwardly to its original position, engaging the inner surface 52 of the control console 12. Simultaneously, the retaining member 38 engages the outer surface 50 of the control console 12, preventing further insertion of the mounting bracket 10 into the control console.

As so mounted, the mounting bracket 10 is substantially incapable of movement either toward or away from the control console, and provides a laterally stable support for the switch package 14 attached thereto.

While the preferred embodiment of the present invention is shown and described herein, it is to be understood that the same is not so limited but shall cover and include any and all modifications thereof which fall within the purview of the invention. For example, the present invention has been specifically described to include mounting tabs having certain physical characteristics or features. It is clear that these tabs may be replaced with similar tabs, or otherwise modified, without departing from the scope and spirit of the presently claimed invention. Although the invention as presently contemplated by the inventors is particularly and specifically described herein, the scope of the invention is not limited thereby, but rather is only defined by the following claims.

What is claimed is:

1. A mounting bracket for a control instrument, said mounting bracket being adapted to attach to said control instrument and to mount to a control console, said mounting bracket comprising:
- a generally planar central body member, said central body member having first and second ends and a longitudinal axis;
- a first mounting tab integrally attached to said central body member at said first end, said first mounting tab being generally in-line with said longitudinal axis;
- a pair of mounting wings, each of said mounting wings being generally coplanar with said central body member and extending from the second end of the central body member at a location laterally outboard of said longitudinal axis, wherein each of mounting said wings has a second mounting tab extending from a terminal end thereof, each of said second tabs being on relatively opposite sides of said central body member and laterally outboard of said longitudinal axis, wherein portions of said first and second mounting tabs are coplanar and cooperate to provide a tripod support for said mounting bracket.

2. A mounting bracket according to claim 1, wherein the first mounting tab comprises a spring finger and a retaining member, the spring finger being adapted to engage an inner surface of the control console and the retaining member being adapted to engage an outer surface of the control console, trapping the control console therebetween and thereby mounting the first end of the mounting bracket to the control console.

3. A mounting bracket according to claim 1, wherein each of the second mounting tabs include laterally inner and outer portions, the inner portions being adapted to engage an outer surface of the control console and the outer portions being adapted to engage an inner surface of the control console, trapping the control console therebetween and thereby mounting the second end of the mounting bracket to the control console.

4. A mounting bracket according to claim 3, wherein the inner portions are generally parallel to the central body member and the outer portions are bent downwardly toward an extension of the central body member.

5. A mounting bracket according to claim 4, wherein the first mounting tab comprises a spring finger and a retaining member, the spring finger being adapted to engage an inner surface of the control console and the retaining member being adapted to engage an outer surface of the control console, trapping the control console therebetween and thereby mounting the first end of the mounting bracket to the control console.

6. A mounting bracket according to claim 5, wherein the inner portions and the retaining member define a plane which is generally parallel to the central body member.

7. A mounting bracket according to claim 6, wherein the first mounting tab extends outwardly from said first end of the central body member and the second mounting tabs are relatively inwardly spaced from a terminal portion of the second end of the central body member.

8. A domestic appliance having a generally box-like cabinet and a control panel extending upwardly from an upper surface thereof, said control panel comprising a control instrument mounting bracket, said bracket comprising:
- a generally planar central body member, said central body member having first and second ends and a longitudinal axis;
- a first mounting tab integrally attached to said central body member at said first end, said first mounting tab being generally in-line with said longitudinal axis;
- a pair of mounting wings, each of said mounting wings being generally coplanar with said central body member and extending from the second end of the central body member at a location laterally outboard of said longitudinal axis, wherein each of mounting said wings has a second mounting tab extending from a terminal end thereof, each of said second mounting tabs being on relatively opposite sides of said central body member and laterally outboard of said longitudinal axis, wherein portions of said first and second mounting tabs are coplanar and cooperate to provide a tripod support for said mounting bracket.

9. A mounting bracket according to claim 8, wherein the first mounting tab comprises a spring finger and a retaining member, the spring finger engaging an inner surface of the control console and the retaining member engaging an outer surface of the control console, trapping the control console therebetween and thereby mounting the first end of the mounting bracket to the control console.

10. A mounting bracket according to claim 8, wherein each of the second mounting tabs include laterally inner and outer portions, the inner portions engaging an outer surface of the control console and the outer portions engaging an inner surface of the control console, trapping the control console therebetween and thereby mounting the second end of the mounting bracket to the control console.

11. A mounting bracket according to claim 10, wherein the inner portions are generally parallel to the central body member and the outer portions are bent downwardly toward an extension of the central body member.

12. A mounting bracket according to claim 11, wherein the first mounting tab comprises a spring finger and a retaining member, the spring finger engaging an inner surface of the control console and the retaining member engaging an outer surface of the control console, trapping the control console therebetween and thereby mounting the first end of the mounting bracket to the control console.

13. A mounting bracket according to claim 12, wherein the inner portions and the retaining member define a plane which is generally parallel to the central body member.

14. A domestic appliance having a generally box-like cabinet and a control panel projecting upwardly therefrom, said control panel having attached thereto a control instrument mounting bracket, said mounting bracket comprising:
- a central body member, said central body member having first and second ends and a longitudinal axis, said central body member generally tracing an upper surface of a control instrument to which the mounting bracket is removably mechanically attached, said central body member also defining a central opening through which a portion of the control instrument projects;
- a first mounting tab integrally attached to said central body member at the first end thereof, said first mounting tab being generally in-line with said longitudinal axis and including a spring finger and a retaining member, said spring finger engaging an inner surface of the control console and said retaining member engaging an outer surface of the control console, trapping the control console therebetween and thereby mounting the first end of the mounting bracket to the control console;

a pair of mounting wings integrally attached to the central body member adjacent the second end thereof, each of said mounting wings being provided on relatively opposite sides of said central body member and laterally outboard of said longitudinal axis and having a second mounting tab at a terminal end thereof, wherein said second mounting tabs include laterally inner and outer portions, the inner portions engaging the outer surface of the control console and the outer portions engaging the inner surface of the control console, trapping the control console therebetween and thereby mounting the second end of the mounting bracket to the control console, said inner portions being generally parallel to the central body member and the outer portions being bent downwardly toward an extension of the central body member, whereby the inner portions and the retaining member define a plane which is generally parallel to the central body member and the first and second mounting tabs cooperate to provide a tripod support for said mounting bracket.

15. A mounting bracket according to claim 14, wherein the first mounting tab extends outwardly from the first end of the central body member and the second mounting tabs are relatively inwardly spaced from a terminal portion of the second end of the central body member.

* * * * *